United States Patent [19]

O'Brien, Jr.

[11] 3,956,539
[45] May 11, 1976

[54] IMIDAZOLINES IN PREPARING FIBROUS ARTIFICIAL SAUSAGE CASINGS

[75] Inventor: Merrill N. O'Brien, Jr., Danville, Ill.

[73] Assignee: Tee-Pak, Inc., Chicago, Ill.

[22] Filed: Sept. 9, 1974

[21] Appl. No.: 504,212

[52] U.S. Cl............................. 427/358; 426/135; 427/326; 427/339; 428/537
[51] Int. Cl.² .................... B05D 3/00; A22C 13/00
[58] Field of Search...................... 117/94, 60, 157; 138/118.1; 260/309.6; 426/135; 427/326, 358, 434, 339; 428/537

[56] References Cited
UNITED STATES PATENTS

| | | | |
|---|---|---|---|
| 2,005,397 | 6/1935 | Schur............................. | 117/157 X |
| 2,108,808 | 2/1938 | Finzel............................. | 117/60 X |
| 2,240,031 | 4/1941 | Bour.............................. | 117/60 X |
| 2,317,779 | 4/1943 | Janser............................ | 117/60 |
| 2,910,380 | 10/1959 | Shiner............................ | 117/94 X |
| 2,962,382 | 11/1960 | Ives.............................. | 117/157 X |
| 3,555,041 | 1/1971 | Katz.............................. | 260/309.6 |
| 3,738,996 | 6/1973 | Bloch............................. | 260/309.6 |

*Primary Examiner*—Harry J. Gwinnell
*Assistant Examiner*—Stuart D. Frenkel
*Attorney, Agent, or Firm*—Paul Shapiro; Joseph E. Kerwin; William A. Dittmann

[57] ABSTRACT

This invention relates to an improvement in a process for preparing reinforced, artificial sausage casings wherein a tubular porous web is passed through a die, impregnated with a polymeric dope, and the polymer regenerated. The improvement resides in employing a porous web having incorporated therein from about 25 to 500 ppm based on the dry weight of the porous web of an alkyl imidazoline ethoxylate of the formula

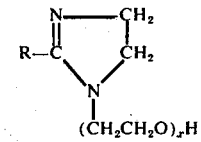

wherein R is a fatty acid radical having from 10 – 22 carbon atoms in the structure and $x$ is a number from about 3 – 10.

6 Claims, No Drawings

IMIDAZOLINES IN PREPARING FIBROUS ARTIFICIAL SAUSAGE CASINGS

BACKGROUND OF THE INVENTION

The procedures for forming reinforced fibrous casings have become relatively standardized over many years of manufacturing. Typically, a fibrous reinforcing material, i.e., a porous web of suitable width is curved about its longitudinal axis to form a tube with overlapping longitudinal margins. The margins are thereafter permanently sealed together. The tubular porous web then is impregnated with a polymeric dope, generally viscose, which is a solution of sodium cellulose xanthate in sodium hydroxide, and the polymer or cellulose subsequently regenerated. The resultant fibrous casings have particular utility in the packaging of meat products such as sausage, bologna, hams, hamburger, and other ground meat products.

It has been apparent for some time that fast and complete wet-out of the porous web by the polymeric dope is necessary in order to provide substantially uniform and adequate properties in the resultant fibrous artificial sausage casing. It is necessary to have substantially complete wet-out of the polymeric dope on the fibrous casing not only for achieving uniformity of strength but also for aesthetic reasons. For example, when penetration and particularly wet-out by the polymeric dope is non-uniform, the casing develops what is referred to in the industry as "glitter spots". Glitter spots are small bubbles imbedded in the casing. Of course, glitter spots give a nonuniform or spotty appearance to the casing. Glitter spots, however, are more of a problem in the preparation of dyed fibrous casings and coated casings although they can be present in clear casings.

Although it is desirous to obtain substantially complete wet-out of the porous web and to complete wet-out of the web in the shortest time possible by the polymeric dope, it is important in the coating of fibrous casings having an internal coating thereon to prevent the polymeric dope from penetrating through the coating on the inside wall of the casing. Quite often, adhesive compositions such as crosslinked gelatin or a polyamide-epichlorohydrin resin, e.g., Kymeme 557 (a Trademark of Hercules, Inc.), are anchored to the inside wall of the porous web for bonding the casing to the meat product. Sometimes, the polymeric dope penetrates through the porous web and the coating, thereby causing the casing to lose its bonding ability to the meat product. In this instance, the casing may be unsuited for the processing of certain types of sausages.

DESCRIPTION OF THE PRIOR ART

It has been proposed in treatment processes to dilute polymeric dopes with water for reducing the penetration time of polymeric dopes into the porous web. The addition of water to the polymeric dope decreases the viscosity of the dope and thereby enhances its ability to penetrate or flow into the voids and capillaries in the porous web. Although the dilution of polymeric dopes, e.g., viscose, with water enhances the penetration rate of viscose into the web, there are certain problems associated therewith. Of course, inherent in the process is the reduction in the amount of polymeric or material, e.g., cellulose in the casing which can be subsequently regenerated. This reduction of polymer in the resultant casing results in a casing having reduced wet and dry strength from a casing prepared with a more concentrated polymer dope.

It has also been proposed to reduce the viscosity of the polymeric dope by heating the dope with an infrared source. The use of infrared lamps resulted in a more rapid penetration of the porous web by the viscose or polymeric dope but the use was difficult to employ in commercial processes. For one thing, it was difficult to obtain uniform heating and maintain an elevated temperature without regenerating the cellulose at the surface. Further, it was difficult to obtain uniform distribution of the polymer throughout the porous web.

It has also been suggested to incorporate surfactants or wetting agents into the polymeric dope for the purpose of reducing the penetration time and improving the distribution or wet-out of the coating in the porous web. However, experimentation has revealed that the penetration times often were longer than penetration times for control polymeric dopes. Further, it was noted in many instances that the polymeric dope was not uniformly distributed throughout the porous web and resulted in a casing having a spotty appearance. A spotty appearance not only is detrimental in terms of aesthetic value but in terms of its non-uniform physical properties such as non-uniform wet and dry strength.

SUMMARY OF THE INVENTION

This invention relates to an improvement in a process for preparing fibrous, artificial sausage casings for the manufacture of sausages, bolognas, and other types of meat products. In the manufacture of fibrous, artificial sausage casings, a porous web, e.g., paper, is curved about its longitudinal axis to form a tube, passed through a die for impregnation with polymeric dope and the polymer subsequently regenerated. The improvement in this basic process resides in employing a porous web having incorporated therein from about 25 to 500 ppm based on the dry weight of the porous web of an alkyl imidazoline ethoxylate of the formula

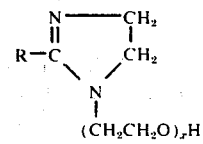

wherein R is a fatty acid radical having from 10 – 22 carbon atoms in the structure and $x$ is a number from about 3 – 10.

Advantages of employing a porous web having an alkyl imidazoline ethoxylate incorporate in the proportions described include:

a porous web which has the ability to permit faster penetration by a polymeric dope over non-treated porous webs, thereby lending such webs to faster production rates;

a porous web having the ability to permit substantially uniform distribution of a polymeric dope therein;

a porous web having the ability to be transformed into a fibrous casing having fewer "glitter spots" than casings which are made from untreated webs;

a porous web having an inner coating bonded to its surface which has the ability to permit a polymeric dope to substantially completely penetrate and wet-out the coated porous web in a commercially acceptable time period without penetrating through the coating on the inside wall of the casing;

a porous web which can be converted to a fibrous casing having substantially uniform physical properties; and a non-coated porous web which can be transformed into a fibrous casing which is highly receptive to "zip" coatings for enhancing peelability of the casing from sausages.

DESCRIPTION OF THE PREFERRED EMBODIMENTS

The porous webs suited for practicing this invention are those conventionally used in the manufacture of fibrous artificial sausage casings. Typically, these porous webs are fibrous materials such as paper, e.g., tissue paper, long fiber hemp, manila hemp, flax, and other cellulosic materials. To date, the preferred porous web is a hemp paper having a weight of about 10 – 17 pounds per ream.

The polymeric dopes suited for practicing the invention are those solutions or dispersions of polymer in a liquid vehicle, typically water, suited for the manufacture of fibrous artificial sausage casings. By far, the most common polymeric dope employed in the manufacture of sausage casings is viscose, which is a solution of sodium cellulose xanthate in caustic soda. Other polymeric dopes which can be employed in practicing the invention include polyvinyl alcohol, hydroxy ethyl cellulose, alginates which can substantially be cross-linked with a bivalent metal such as calcium, denitrated cellulose nitrate, and the like.

The surfactant or wetting agent used in practicing this invention is a cyclic nitrogen analogue of a carboxylic acid amide reacted with ethylene oxide. These commonly are referred to as long chain alkyl imidazoline ethoxylates. The alkyl groups are representative of fatty acid radicals having from about 10 – 22 carbon atoms in the structure and preferably from about 10 – 14 carbon atoms. Often, the fatty acid portion is a mixture derived from fatty oils such as cotton seed, soybean, palm kernel, coconut, and corn oil.

The surfactant, i.e., the long chain alkyl imidazolines, have a plurality of ethoxy groups for providing hydrophilicity to the compound. Generally, from about 3 – 10 moles ethylene oxide are reacted with each mole of alkyl imidazoline in order to provide the hydrophilicity necessary for obtaining acceptable penetration of the web. In a preferred embodiment from about 5 – 7 moles ethylene oxide are present in the alkyl imidazoline ethoxylate.

The structure of the surfactant or wetting agent incorporated into the porous web for the purpose of enhancing the penetration of a polymeric dope into the porous web and uniformity of impregnation is as follows:

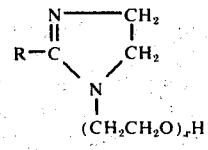

wherein R is a fatty acid radical having from 10 – 22 carbon atoms in the structure and x is a number from about 3 – 19.

The surfactant, of course, should be incorporated into the porous web prior to impregnation with the polymeric dope so that the surfactant is in complete contact with the web at the time of impregnation. The surfactant may be applied by spraying, brushing, or rolling a dispersion of the surfactant in water onto the porous web prior to impregnation or it may be incorporated into the paper at the paper-making stage. Either method is adequate for achieving the results previously mentioned. What is desired is that the surfactant be in contact with the fibers of the porous web at the time of impregnation with the polymeric dope.

The alkyl imidazoline ethoxylates are incorporated into the porous web in a proportion of from about 25 to 500 ppm based on the dry weight of the porous web. When a proportion of alkyl imidazoline ethoxylate exceeds about 600 ppm, there is a tendency for the polymeric dope to penetrate completely through the porous web and particularly through coated porous webs which may result in destroying the effectiveness of "Securex" type coatings anchored to the inside walls of the casing. Sometimes, occasional penetration of the casing may occur as the concentration of surfactant in the porous web approaches 300 ppm. But, with exercise of care, e.g., control of residence time in the impregnation zone, complete penetration of the web can be avoided. In other words, as the concentration of surfactant approaches about 300 ppm, the impregnation time must be watched and shortened if the polymeric dope passes through and penetrates the inside coating. Impregnation can be checked by introducing the impregnation casing into the coagulating bath. When the concentration of alkyl imidazoline ethoxylate is less than about 25 ppm based on the weight of the porous web, there seems to be little improvement over an untreated paper in terms of impregnation rate and uniformity of distribution of the polymeric dope in the porous web. Accordingly, less than about 25 ppm alkyl imidazoline ethoxylate is not desired.

The following examples are provided to illustrate preferred embodiments of the invention and all percentages are expressed as weight percentages.

EXAMPLE 1

A fibrous casing is produced in a conventional process typically as shown in U.S. Pat. No. 3,275,456. In the process, a ribbon of paper of a long fiber hemp paper having a weight of 14 pounds per ream passes from a roll and over rollers and guides for forming the paper into a tubular form. The paper proceeds downwardly over a mandrel, usually a steel pipe, having an outside diameter of from about 2 – 7 inches depending on the size of the casing to be produced and through a forming ring. The forming ring is a metallic ring having an outside diameter slightly larger than the diameter of the paper tube passing through it and functions to maintain the paper in the form of a tube until it reaches the coating die.

As the tubular shaped paper passes downwardly over the mandrel, the paper is uniformly sprayed with a 1000 ppm aqueous solution of an alkyl imidazoline ethoxylate wherein the alkyl group is characteristic of fatty acids of coconut oil and the ethoxylate is present in a proportion of about 3 – 5 moles per molecule in water. This imidazoline ethoxylate is sold under the trademark Viscospin B by Sandoz Chemical. The alkyl imidazoline ethoxylate is applied in a proportion to provide from about 300 ppm Viscospin B based on the weight of the dry paper.

Usually from about 2 – 10 seconds elapse between the time the paper is sprayed with the Viscospin B before the paper reaches the impregnation zone. In the impregnation zone, viscose having a cellulose content of about 7% and a viscosity of about 75 poises is introduced through an annular die for thoroughly impregnating and coating the paper tube. After impregnation, the viscose impregnated paper tube is introduced into a coagulating bath containing a conventional coagulating solution, e.g., 5% sulfuric acid for coagulation and regeneration. The fibrous casing then is processed in the customary manner to final form.

The resultant casing has an excellent appearance and there are very few glitter spots present in the casing. The wet-out of the viscose in the casing is substantially uniform and complete for providing uniform physical properties.

When the above casing is internally coated with a "Zip" coating composition, such as a ketene dimer, the Zip coating is uniform on the inside wall of the casing and the casing has excellent Zip properties, i.e., the casing is readily peeled from sausages processed therein.

Untreated fibrous casings produced in substantially the same manner as the casing produced above have a viscose penetration time of about 20 – 25 seconds as opposed to 5 – 8 seconds for the Viscospin B treated paper and there are substantially more glitter spots in the non-treated casing.

EXAMPLE 2

Several fibrous casings are made in accordance with the procedure set forth in Example 1 except that various levels of Viscospin B are employed in the paper in the ppm noted and the casings evaluated. Such casings are evaluated in terms of the viscose penetration time (25°C., 60% RH) and visual appearance. For visual examination, a panel of judges evaluates the casing giving a casing with substantially no glitter spots a rating of 0 and a casing which is almost completely covered with glitter spots a rating of 10. Numbers are then assigned between 0– 10 for degrees of glitter spots in between these limits. The results of such tests are noted in the table below.

FIBROUS CASING

| PPM VISCOSPIN B | CASING VISUAL RATING | PENETRATION SECONDS |
| --- | --- | --- |
| 0 | 5 – 7 | 20 – 25 |
| 75 | 3 – 4 | 16 – 18 |
| 150 | 1 – 2 | 10 – 14 |
| 300 | 0 – 1 | 6 – 8 |
| 500 | 0 – 1 | 5 – 7 |

The above table shows that the surfactant performs well at levels of about 150 – 300 ppm.

EXAMPLE 3

A casing is produced in accordance with the procedure of Example 1 except that the alkyl imidazoline ethoxylate (Viscospin B) solution is added to the paper-making process in a proportion sufficient to provide about 300 ppm Viscospin B based on the weight of the dry paper produced. Casing produced with the treated paper has outstanding penetration rates of viscose into the paper, e.g., 5 – 8 seconds at the preferred levels as opposed to 18 – 25 seconds for nontreated paper, and there is substantially complete wet-out of the paper fibers by the viscose. On visual inspection of the casing, there are only a few glitter spots. Using the visual rating test set forth in Example 2, the casing has a rating of about 1 – 1½.

EXAMPLE 4

A casing is prepared in accordance with the procedure of Example 3 except that the porous web has been impregnated with a gelatin solution for providing a Securex type coating on the inner surface of the casing. In the preparation of the paper for casing manufacture roll paper stock is passed into a dip tank containing a gelatin solution and a sufficient quantity of Viscospin B to provide 300 ppm by weight of the paper and then dried. The gelatin is subsequently crosslinked. The casing then is formed from the paper in accordance with the procedure in Example 1, impregnated with a fibrous viscose having a cellulose content of about 7%, and a viscosity of about 75 poises. Impregnation is effected in about 10 seconds and then the viscose impregnated paper tube is passed into the coagulating bath for coagulation and subsequent regeneration. The residence time for the impregnation cycle is from about 10 – 15 seconds.

The resultant casing when finally processed and dried has outstanding physical characteristics. There are substantially no glitter spots in the casing showing that there has been substantially complete wet-out of the fibers in the paper by the viscose. On the other hand, a non-treated Securex paper has considerably more glitter spots than the treated casing. Panel experts find that the treated casing has a visual appearance of 1 and the non-treated casing has an appearance of from 2 – 3.

I claim:

1. In a process for preparing a reinforced, artificial sausage casing comprising passing a tubular porous web through a die, impregnating the web with a polymeric dope introduced through said die and regenerating the polymer, the improvement which comprises employing a porous web having incorporated therein from about 25 – 500 ppm based on the weight of the porous web of an alkyl imidazoline ethoxylate of the formula:

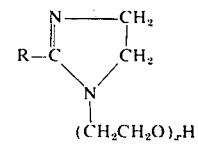

where R is a fatty acid radical having from 10 – 22 carbon atoms in the structure and $x$ is a number from 3 – 10.

2. The process of claim 1 wherein said polymeric dope is viscose.

3. The process of claim 2 wherein R is a saturated fatty acid radical having from 10 – 14 carbon atoms in the structure.

4. The process of claim 3 wherein $x$ is a number from 5 – 7.

5. The process of claim 4 wherein said imidazoline ethoxylate is incorporated in said web in a proportion of from about 150 – 300 ppm.

6. The process of claim 5 wherein said porous web is paper.

* * * * *